No. 614,797. Patented Nov. 22, 1898.
C. DOBSON.
APPARATUS FOR WORKING AND MOLDING DOUGH.
(Application filed Aug. 20, 1898.)
(No Model.) 3 Sheets—Sheet 1.
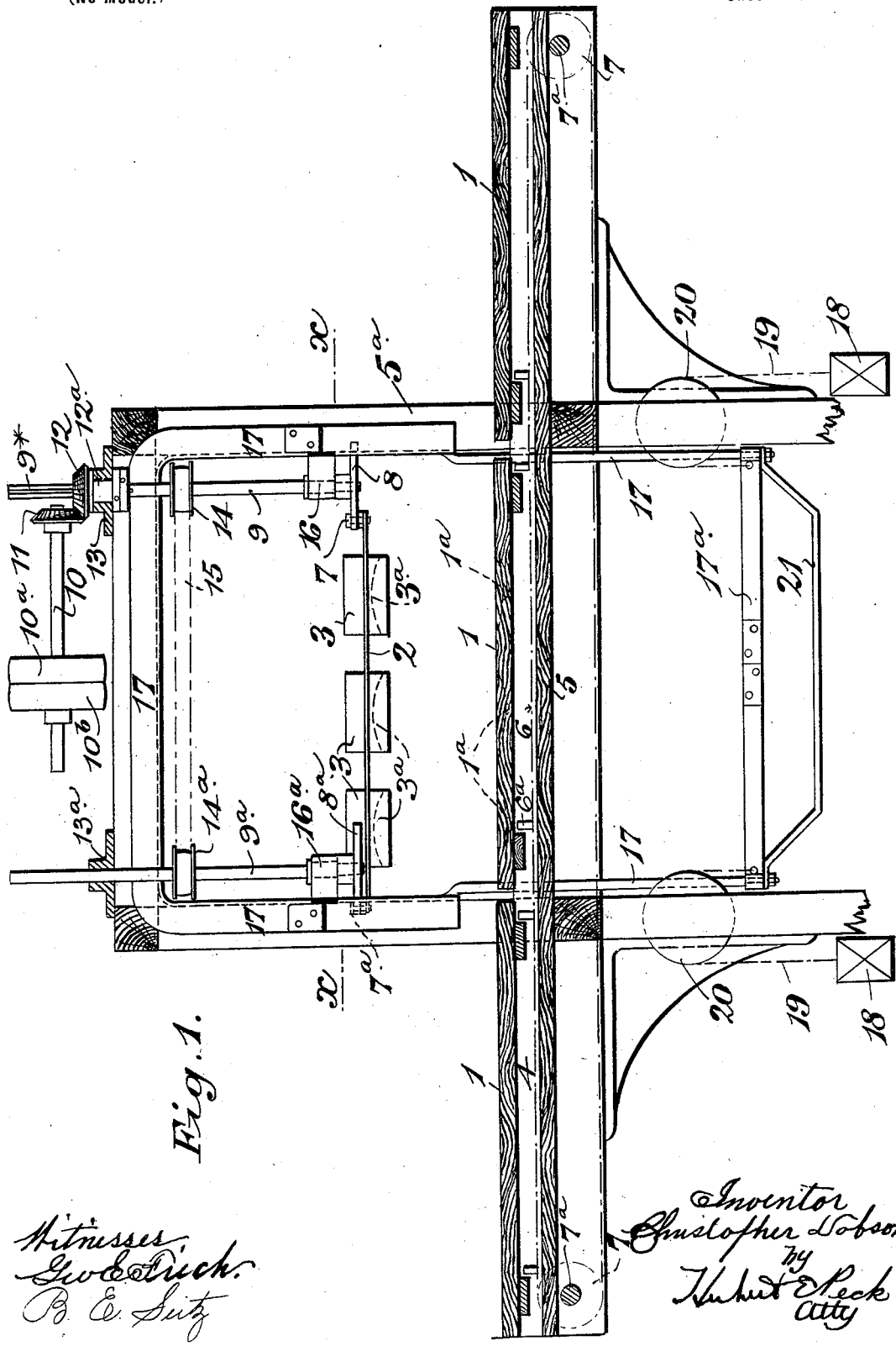

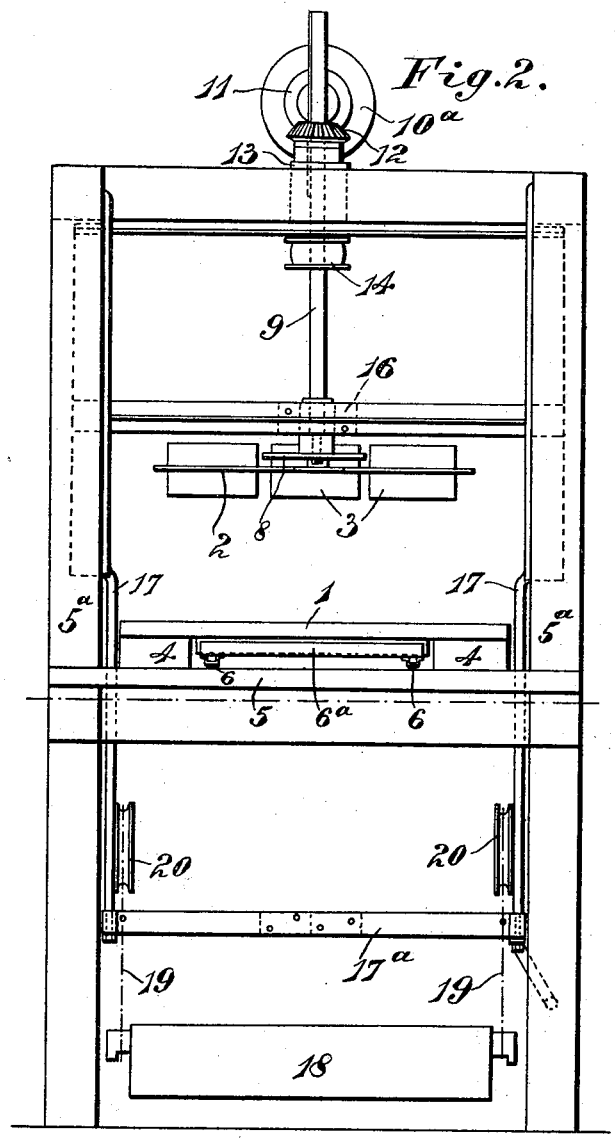

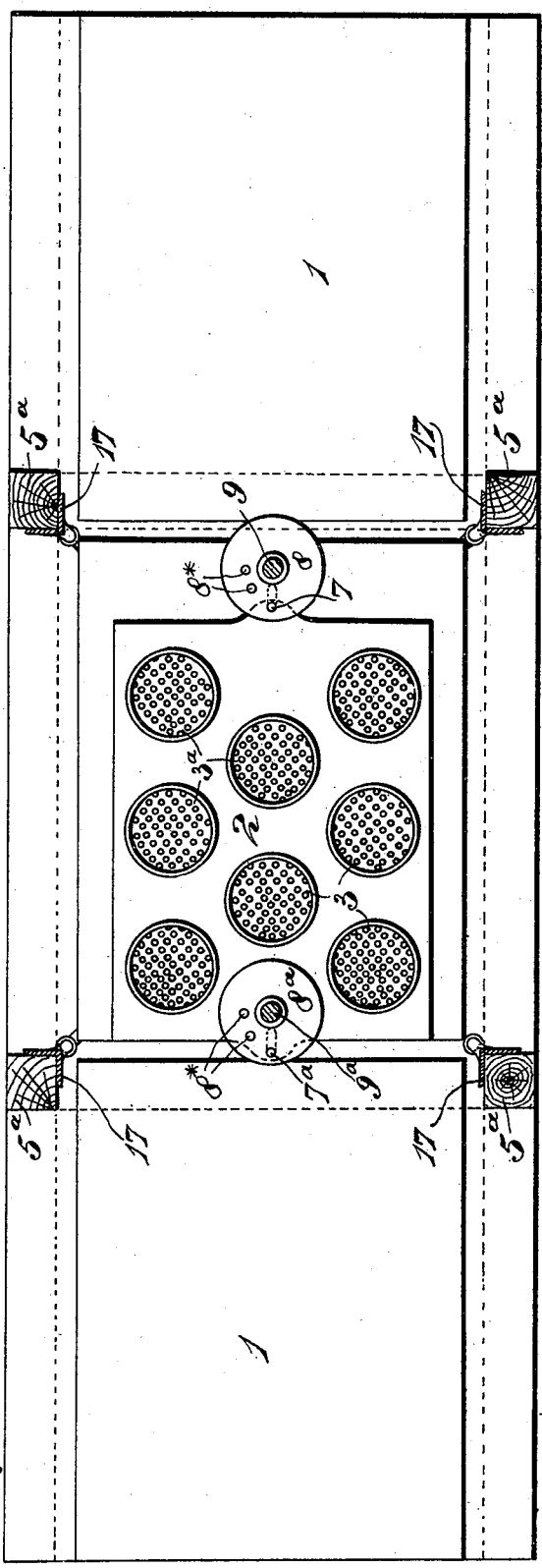

UNITED STATES PATENT OFFICE.

CHRISTOPHER DOBSON, OF KIRKHAM, ENGLAND, ASSIGNOR TO ROBERT KENNETH BALCARRAS, OF MANCHESTER, ENGLAND.

APPARATUS FOR WORKING AND MOLDING DOUGH.

SPECIFICATION forming part of Letters Patent No. 614,797, dated November 22, 1898.

Application filed August 20, 1898. Serial No. 689,091. (No model.)

*To all whom it may concern:*

Be it known that I, CHRISTOPHER DOBSON, a subject of the Queen of Great Britain and Ireland, residing at Kirkham, in the county of Lancaster, England, have invented Improvements in Apparatus for Working and Molding Dough, of which the following is a specification.

This invention has reference to apparatus whereby a gyratory or circumrotary motion can be imparted to dough, so that it will become rubbed or rolled and thereby worked up and molded in a similar manner to that in which pieces of dough have heretofore been worked up and molded by hand for the purpose of making loaves, tea-cakes, buns, and the like. For this purpose the apparatus is provided with one or more endwise-movable presses, to which a gyratory or circumrotary motion is imparted and which or each of which is adapted to engage with and impart a similar motion to a piece of dough placed between it and a table or board.

Apparatus to act in the manner described can be constructed in various forms.

Figures 1 and 2 of the accompanying illustrative drawings are elevations at right angles to one another; and Fig. 3 is a horizontal section on the line $x\,x$ of Fig. 1, showing one construction of apparatus according to this invention.

In this example there are three tables or boards 1, the center one of which is arranged below a movable holder 2, provided with a number of piston-like or cylindrical pressers 3, having perforated bottoms $3^a$, so that a number of pieces of dough can be simultaneously operated upon. Each table may be formed with a number of shallow concave depressions $1^a$ to increase the bite or hold on the lower side of the pieces of dough being operated upon. The pressers 3 may conveniently be made of sheet metal, and the perforated bottoms $3^a$ may be of concave or dome shape, as shown. The boards 1 are mounted to slide upon longitudinal bearers 4 on the fixed bed 5 of the framing $5^a$ of the apparatus and are moved endwise by tappets or projections $6^a$, carried by two endless chains or bands 6, which are arranged to pass around pulleys 7 7, that can be rotated by a handwheel (not shown) fixed upon the shaft $7^a$ of one of them.

By using three boards, as shown, molded pieces of dough can be removed from the forward one and fresh pieces of dough be placed upon the rearward one while the pieces of dough on the middle one are being operated upon, thus admitting of a large output from the apparatus.

The holder 2 consists of a wooden board formed with a number of circular holes to receive the pressers 3. These pressers are capable of being slid by hand a greater or less distance up or down in the circular holes in the holder 2 to suit the sizes of the loaves, buns, or the like to be made, the small perforation in the concave or dome-shaped bottoms $3^a$ serving to allow dry flour to work through upon the dough in process of being molded. The pressers 3 may be weighted in any suitable way. It may be by loose shot placed in them, and which by rolling about will assist the flour to pass through the perforated bottoms $3^a$. The holder 2 is suspended by pins 7 $7^a$ from a pair of crank-disks 8 $8^a$, fixed upon vertical spindles 9 $9^a$, which are suitably rotated for the purpose of imparting the desired gyratory or circumrotary motion to the holder and the pressers 3 carried thereby. For this purpose in the example shown there is conveniently mounted at the upper part of the framework of the machine a driving-shaft 10, provided with fast and loose pulleys $10^a$ $10^b$, driven by a belt from a suitable source of power. At one end of the spindle 10 is a bevel gear-wheel 11, that engages with another bevel gear-wheel 12, the sleeve $12^a$ of which rotates within a bracket 13, fixed to the framework $5^a$. Passing through the gear-wheel 12 and rotated thereby is the vertical spindle 9, which is provided with a long key or feather $9^\times$, that can slide freely in a corresponding keyway in the gear-wheel 12 and enables the said spindle to be raised or lowered. The vertical spindle $9^a$ is arranged to slide vertically in a bearing-bracket $13^a$ and in the example shown is provided with a pulley 14ª, by which it can be rotated from a similar pulley 14 on the spindle 9 through an endless belt 15. If desired, the spindle 9ª might be driven from the shaft 10 through gearing like the spindle 9. The vertical spindles 9 9ª and their attached parts are carried by means of brackets 16 16ª, upon which rest collars formed on the said spindles, the said brackets being fixed to a frame or support 17.

In order that the vertical distance between the concave bottoms 3ª and depressions 1ª on the pressers and board, respectively, can be varied to suit requirement, the holder 2 is made vertically adjustable. For this purpose the frame or support 17 carrying it is made capable of being raised and lowered and is formed at its upper part of angle-iron for the purpose of being guided in its vertical movements by the framing 5ª of the apparatus. It is held in the raised position by means of balance-weights 18, adapted to counterbalance the frame 17 and the parts carried thereby, the said weights being suspended by chains 19, that pass around guide-pulleys 20 from the lower part of the frame or support 17, which is provided with a suitable bar or rail 21, by which the frame, with holder, pressers, and attached parts, can be forced down to the required extent by a foot of the operator. The lower end of the frame 17 consists of rods connected together by cross-stays 17ª.

The amount of gyratory movement imparted to the holder 2 and pressers 3 can, if desired, be varied to suit different requirements by forming the disks 8 8ª with several holes 8ˣ of varying eccentricity, and into either of which the crank-pins 7 7ª can be placed.

As will be seen, the construction of the apparatus hereinbefore described is such that when the pressers 3 are lowered upon pieces of dough placed upon the board 1 below the pressers and the vertical spindles are rotated a gyratory movement will be imparted to the holder 2 and pressers 3 carried thereby, so that each piece of dough will be rubbed or rolled between the board and the presser above it, whereby the said piece of dough will become worked up in a manner similar to that effected by hand-working and will be gradually brought to the required rounded form.

The apparatus is specially advantageous for producing the top and bottom pieces of dough required for making loaves of bread of the kind known as "cottage" loaves.

The shape of each presser may be variously modified, provided it is capable of rising and falling, and will upon being operated as described rub or roll a piece of dough placed between it and the board, so as to work the same after the manner of hand-worked dough.

What I claim is—

1. In an apparatus for working dough, the combination of two opposing parts between which a piece of dough can be held, means for imparting a gyratory motion to one of said parts, one of said parts provided with one or more dough-holding recesses, and the opposite part provided with one or more piston-like dough-pressers, substantially as described.

2. Apparatus for working and molding dough, comprising a table or board, a holder arranged opposite said table or board, one or more pressers carried by said holder, and means for imparting a gyatory motion to said holder.

3. Apparatus for working and molding dough, comprising a table or board, a holder arranged opposite said table, or board, one or more pressers mounted in said holder and formed with a recessed lower side, and means for imparting a gyratory motion to said holder.

4. Apparatus for working and molding dough, comprising a board, a vertically-adjustable holder arranged above the same, a piston-like hollow presser adapted to move endwise in said holder and formed with a perforated recessed bottom, and means for imparting a gyratory motion to said holder, substantially as described for the purposes specified.

5. Apparatus for working and molding dough, comprising a table or board, a holder arranged above the same and formed with a plurality of guiding-holes therethrough, a plurality of pressers adapted to slide endwise through said holes and to engage and hold pieces of dough placed between them and said table or board, means for imparting a gyratory motion to said holder, and a vertically-movable support carrying said holder and attached parts, substantially as described.

6. Apparatus for working and molding dough, comprising a table or board, a holder arranged above the same and formed with a plurality of guiding-holes therethrough, a plurality of hollow pressers adapted to slide endwise through said holes and each formed with a perforated recessed bottom, means for imparting a gyratory motion to said holder, and a vertically-movable support carrying said holder and attached parts substantially as described.

7. Apparatus for working and molding dough, comprising a table or board formed with a plurality of concave recesses in its upper side, a holder arranged above said table or board and formed with a plurality of guideways therethrough, a plurality of hollow pressers mounted to slide endwise through said guideways and each formed with a perforated recessed bottom, a vertically-adjustable support, and crank-driving mechanism carried by said support and whereby a gyratory motion can be imparted to said holder, substantially as described.

8. Apparatus for working and molding dough, comprising a table or board, a holder arranged above said table or board and formed with a plurality of guideways therethrough, a plurality of hollow pressers mounted to slide endwise through said guideways and each formed with a perforated recessed bottom, crank-disks having radially-adjustable crank-pins connected to said holder, mechanism for rotating said crank-disk, and a vertically-adjustable support carrying said crank-disks, holder and attached parts, substantially as described for the purposes specified.

Signed at Preston, in the county of Lancaster, this 9th day of August, 1898.

CHRISTOPHER DOBSON.

Witnesses:
T. H. CLARKE,
M. LUTENER.